US012747801B2

(12) United States Patent
Ramos et al.

(10) Patent No.: US 12,747,801 B2
(45) Date of Patent: Sep. 29, 2026

(54) AIR VALVE, INFLATION, AND DEFLATION APPARATUSES AND METHODS

(71) Applicant: BELGRAVIA WOOD LIMITED, Hong Kong (HK)

(72) Inventors: Jaime Ramos, Moorpark, CA (US); Paul Olsen, Stuart, FL (US)

(73) Assignee: Belgravia Wood Limited, Central (HK)

( * ) Notice: Subject to any disclaimer, the term of this patent is extended or adjusted under 35 U.S.C. 154(b) by 98 days.

(21) Appl. No.: 18/150,708

(22) Filed: Jan. 5, 2023

(65) Prior Publication Data

US 2023/0213106 A1 Jul. 6, 2023

Related U.S. Application Data

(60) Provisional application No. 63/266,442, filed on Jan. 5, 2022.

(51) Int. Cl.

*F16K 24/06* (2006.01)
*A63B 41/12* (2006.01)
*F16K 15/18* (2006.01)
*F16K 15/20* (2006.01)

(52) U.S. Cl.

CPC .......... *F16K 24/06* (2013.01); *F16K 15/1825* (2021.08); *A63B 41/12* (2013.01); *F16K 15/202* (2013.01); *Y10T 137/3584* (2015.04)

(58) Field of Classification Search

CPC ..... A63B 41/12; F16K 15/1825; F16K 15/20; F16K 15/202

USPC .......................... 141/114, 313; 81/15.2, 15.4

See application file for complete search history.

(56) References Cited

U.S. PATENT DOCUMENTS 1,460,027 A * 6/1923 Maddock ................ B60C 29/00 81/15.4
1,630,040 A * 5/1927 Vogt ...................... F16K 15/202 473/611
1,664,621 A * 4/1928 Goff ........................ B29B 15/06 81/15.4
1,811,656 A * 6/1931 Sommerbeck .......... B29C 73/06 81/15.7
1,914,800 A * 6/1933 Boyett .................... B29C 73/26 30/169
1,990,000 A * 2/1935 Pike ........................ B60C 25/16 81/15.4
2,026,933 A * 1/1936 De Laney ............. A63B 41/12 137/317
2,353,386 A * 7/1944 Bourcier ................ E01F 13/12 411/479

(Continued)

*Primary Examiner* — Robert K Arundale

(74) *Attorney, Agent, or Firm* — Finnegan, Henderson, Farabow, Garrett & Dunner LLP

(57) ABSTRACT

Embodiments of the present disclosure provide systems and methods for an air valve and an air valve adapter. The air valve may comprise a base, a top attached to the base via a hinge, a tab connected to the top, and a gripping shape disposed at an end of the tab, wherein the gripping shape is disposed within a well of the base. The base may be attached to an inflatable apparatus via a weld or an adhesive. The air valve adapter may comprise an inserting end, a hollow end, a gripping section between the inserting end and the hollow end, and an aperture in the gripping section, wherein air may supplied in the inserting end to travel to the hollow end.

21 Claims, 10 Drawing Sheets

(56) References Cited

U.S. PATENT DOCUMENTS

| | | | | | | |
|---|---|---|---|---|---|---|
| 2,600,862 | A | * | 6/1952 | Fenton | F16K 15/202 | 473/610 |
| 2,977,973 | A | * | 4/1961 | Chakine | F16L 55/1141 | 116/DIG. 44 |
| 3,100,498 | A | * | 8/1963 | Gibson, Jr. | F16K 15/202 | 473/611 |
| 3,368,302 | A | * | 2/1968 | Martino | B64B 1/62 | 222/402.1 |
| 3,401,714 | A | * | 9/1968 | Scott | F16K 15/202 | 446/222 |
| 3,592,245 | A | * | 7/1971 | Schneller | B65D 47/06 | 141/24 |
| 3,902,517 | A | * | 9/1975 | Hastwell | F21L 19/00 | 431/344 |
| 3,905,387 | A | * | 9/1975 | Grant | F16K 15/202 | 137/223 |
| 3,933,177 | A | * | 1/1976 | Dwyer, Jr. | F16K 15/20 | 220/DIG. 14 |
| 3,985,139 | A | * | 10/1976 | Penar | A61M 25/1018 | 604/99.01 |
| 4,014,048 | A | * | 3/1977 | Rappleyea | A42B 3/122 | 2/413 |
| 4,031,688 | A | * | 6/1977 | Wasserman | A63B 39/04 | 81/15.2 |
| 4,043,356 | A | * | 8/1977 | Morris | A63B 41/12 | 137/320 |
| 4,114,230 | A | * | 9/1978 | MacFarland | A47L 7/04 | 15/330 |
| 4,153,096 | A | * | 5/1979 | Kirk | B60C 29/00 | 141/285 |
| 4,405,158 | A | * | 9/1983 | Huberman | A47L 7/04 | 289/7 |
| 4,462,449 | A | * | 7/1984 | Zabel, Jr. | B60C 29/00 | 152/428 |
| 4,567,922 | A | * | 2/1986 | Lepisto | B65B 1/18 | 141/10 |
| 4,568,081 | A | * | 2/1986 | Martin | F16K 15/202 | 473/611 |
| 4,574,851 | A | * | 3/1986 | Lepisto | B65B 1/18 | 141/85 |
| 4,714,098 | A | * | 12/1987 | Stuckel | A63B 41/12 | 141/85 |
| 4,768,537 | A | * | 9/1988 | Tash | F16L 31/00 | 137/232 |
| 4,795,426 | A | * | 1/1989 | Jones | A61B 17/3421 | 604/164.11 |
| 4,823,831 | A | * | 4/1989 | Jaw | F16K 15/202 | 137/232 |
| 4,871,354 | A | * | 10/1989 | Conn | A61J 1/2089 | 604/416 |
| 4,948,092 | A | * | 8/1990 | Kasper | F16K 15/1825 | 251/82 |
| 5,033,498 | A | * | 7/1991 | Brandt | F16K 15/202 | 137/223 |
| 5,050,266 | A | * | 9/1991 | Schneider | A47L 9/242 | 15/375 |
| 5,119,842 | A | * | 6/1992 | Jaw | F16K 15/1825 | 137/232 |
| 5,343,889 | A | * | 9/1994 | Jaw | F16K 15/205 | 137/232 |
| 5,526,853 | A | * | 6/1996 | McPhee | A61J 1/2089 | 604/408 |
| 5,556,258 | A | * | 9/1996 | Lange | F04B 33/00 | 417/63 |
| D375,315 | S | * | 11/1996 | Paul-Johansson | D15/7 | |
| 5,605,356 | A | * | 2/1997 | Salvi | F16L 37/02 | 285/38 |
| 5,746,243 | A | * | 5/1998 | Franke | F16K 15/202 | 137/231 |
| 5,771,665 | A | * | 6/1998 | Nelson | B65B 43/56 | 53/570 |
| 5,778,923 | A | * | 7/1998 | Marston | F16K 15/207 | 137/228 |
| 5,806,572 | A | * | 9/1998 | Voller | B65D 81/052 | 141/10 |
| 5,855,222 | A | * | 1/1999 | Jou | B05B 1/005 | 137/580 |
| D406,267 | S | * | 3/1999 | Carter | D15/7 | |
| 5,902,097 | A | * | 5/1999 | Wu | B62J 11/02 | 417/440 |
| 5,915,407 | A | * | 6/1999 | West | F16K 15/202 | 446/224 |
| 5,960,907 | A | * | 10/1999 | Chau | B67C 11/00 | 141/97 |
| 5,975,109 | A | * | 11/1999 | Wu | B60S 5/04 | 137/231 |
| 6,073,645 | A | * | 6/2000 | Wu | F04B 33/005 | 137/231 |
| 6,164,314 | A | * | 12/2000 | Saputo | F16K 15/205 | 137/232 |
| 6,295,693 | B1 | * | 10/2001 | Chou | F04D 29/626 | 141/66 |
| 6,347,642 | B1 | * | 2/2002 | Schulte | F04B 33/00 | 251/149.9 |
| 6,394,992 | B1 | * | 5/2002 | Sjoholm | A61M 5/162 | 604/199 |
| D460,704 | S | * | 7/2002 | Peele | D10/86 | |
| 6,923,222 | B2 | * | 8/2005 | Gaines | A63B 41/12 | 24/3.13 |
| D611,961 | S | * | 3/2010 | Boussu | D15/7 | |
| 7,730,913 | B2 | * | 6/2010 | Voorhies | A63B 41/12 | 141/114 |
| 7,857,015 | B2 | * | 12/2010 | Voorhies | A63B 41/12 | 141/114 |
| 8,402,986 | B1 | * | 3/2013 | Gray | A47L 7/04 | 137/223 |
| 8,733,388 | B1 | * | 5/2014 | Gray | A47L 7/04 | 137/223 |
| D740,328 | S | * | 10/2015 | Maw | D15/7 | |
| 9,227,600 | B2 | * | 1/2016 | Chen | B60S 5/04 | |
| 9,309,980 | B2 | * | 4/2016 | Ward | F04B 33/005 | |
| 9,587,753 | B2 | * | 3/2017 | Wang | F16K 15/20 | |
| 9,618,130 | B1 | * | 4/2017 | Nguyen | B65D 31/147 | |
| 9,784,379 | B2 | * | 10/2017 | Slocum | F16K 15/202 | |
| D836,324 | S | * | 12/2018 | Michalski | D3/28 | |
| D859,969 | S | * | 9/2019 | Yu | D15/7 | |
| 10,507,474 | B2 | * | 12/2019 | Tsai | F16K 15/205 | |
| D879,838 | S | * | 3/2020 | Maw | D15/7 | |
| D883,777 | S | * | 5/2020 | Yu | D15/7 | |
| 11,221,082 | B2 | * | 1/2022 | Huang | A47C 27/081 | |
| 11,318,800 | B1 | * | 5/2022 | Kreuzthaler | B60C 29/06 | |
| 11,767,924 | B1 | * | 9/2023 | Lee | F16K 24/00 | 137/231 |
| 11,850,898 | B1 | * | 12/2023 | Tages | B60C 29/064 | |
| 12,013,054 | B1 | * | 6/2024 | Tages | F16K 24/06 | |
| 2003/0141477 | A1 | * | 7/2003 | Miller | F16K 15/1825 | 251/149.1 |
| 2003/0230358 | A1 | * | 12/2003 | Lee | G01L 17/00 | 141/95 |
| 2004/0129311 | A1 | * | 7/2004 | Courtney | F16K 15/20 | 137/223 |
| 2004/0159350 | A1 | * | 8/2004 | Lai | F16K 15/202 | 137/223 |
| 2005/0087715 | A1 | * | 4/2005 | Doyle | A61M 39/26 | 604/537 |
| 2005/0173000 | A1 | * | 8/2005 | Wang | F16K 15/205 | 137/223 |
| 2005/0187524 | A1 | * | 8/2005 | Willis | A61M 39/26 | 604/256 |
| 2007/0235677 | A1 | * | 10/2007 | Wang | F04B 33/005 | 251/205 |
| 2008/0092985 | A1 | * | 4/2008 | Voorhies | A63B 41/12 | 141/329 |
| 2008/0177244 | A1 | * | 7/2008 | Capitaine | A61J 1/2089 | 141/114 |
| 2009/0025825 | A1 | * | 1/2009 | Voorhies | A63B 41/12 | 29/33 D |

(56) References Cited

U.S. PATENT DOCUMENTS

2010/0043914 A1* 2/2010 Pansegrouw .......... A63B 41/12 137/232
2010/0167851 A1* 7/2010 Burke .................... A63B 41/00 473/610
2011/0079573 A1* 4/2011 Nakamura ......... B65D 41/0492 215/331
2011/0168314 A1* 7/2011 Palaoro ................... B60C 29/00 152/427
2012/0125446 A1* 5/2012 Chuang ................... B60C 29/06 137/231
2012/0234401 A1* 9/2012 Wu ......................... F16K 15/20 137/231
2013/0105001 A1* 5/2013 Huang .................... B60C 29/06 137/315.01
2013/0255790 A1* 10/2013 Cherry, Sr. ............... B60S 5/04 137/12
2014/0216570 A1* 8/2014 Connors ............... F16K 15/207 137/230
2015/0101678 A1* 4/2015 Chu ...................... B60C 29/068 137/228
2015/0192212 A1* 7/2015 Landi, Jr. .............. F16K 15/202 264/523
2015/0316159 A1* 11/2015 Wang ...................... F16K 15/20 137/231
2015/0337974 A1* 11/2015 Allen ..................... B65D 81/36 137/232
2017/0088102 A1* 3/2017 Davidson .................. B60S 5/04
2017/0252551 A1* 9/2017 Schlitt ..................... F16L 37/40
2017/0370487 A1* 12/2017 Maxfield ........... F16K 31/52425
2019/0145536 A1* 5/2019 Allen ......................... F41J 5/26 137/232
2019/0276118 A1* 9/2019 Heberling, II ............ B63C 9/24
2019/0309864 A1* 10/2019 Bouteiller ............. F16K 15/147
2020/0018409 A1* 1/2020 Roach ................... F04B 39/123
2020/0056711 A1* 2/2020 Huang .................. F16K 15/205
2020/0086700 A1* 3/2020 Kobler .................. F16K 15/202
2021/0086571 A1* 3/2021 Chou .................... B60C 29/064
2021/0285556 A1* 9/2021 Quintana .............. F04B 33/005
2021/0310573 A1* 10/2021 Jwo ....................... F16K 15/202
2022/0125213 A1* 4/2022 Ocegueda Gallaga ...................... F16K 15/202
2022/0232993 A1* 7/2022 Leung ................... F16K 15/202
2023/0115823 A1* 4/2023 Hsu ....................... F16K 15/205 137/614.03
2023/0213106 A1* 7/2023 Ramos ................. A47C 27/081 285/80
2024/0142013 A1* 5/2024 Cox ........................ F16K 15/20

* cited by examiner

600

600

600

700

700

AIR VALVE, INFLATION, AND DEFLATION APPARATUSES AND METHODS

FIELD OF THE INVENTION

The presently disclosed subject matter generally relates to systems and methods for air valves, inflation, and deflation, such as for inflatable apparatuses.

BACKGROUND

A variety of inflatable apparatuses require a user to blow air or manipulate an air blower to cause the inflatable apparatus to inflate. Inflatable apparatuses can be inflatable air mattresses, pool flotation devices, toys, hot tubs, or a number of similar devices. Known air valves do not adequately assist the user with providing air to fill inflatable apparatuses. Known air valves can be difficult to open and difficult to manipulate.

As disclosed herein, air valves can be improved by providing the user with consistent and efficient access to providing air to fill and deflate inflatable apparatuses. For example, air valves may include features that are easier to grip and that are more easily accessible.

Additionally, a valve adapter can be improved by allowing for easier access to the air valve. For example, the valve adapter may include features for gripping the valve adapter, features to facilitate engagement of the air valve, features to facilitate and allow for both inflation and deflation, and/or features to allow for multiple methods of inflation for a number of different inflatable apparatuses.

SUMMARY

Briefly described, embodiments of the presently disclosed subject matter relate to systems and methods for an air inflation and/or deflation tool. According to some embodiments, an air valve may comprise a base, a top attached to the base via a hinge, a tab connected to the top, and a gripping shape disposed at an end of the tab, wherein the gripping shape is disposed within a well of the base. The base can be attached to an inflatable apparatus via a weld or an adhesive. According to some embodiments, the gripping shape may be spherical. According to some embodiments, the well may be concave. According to some embodiments, the well may allow a user to extend a portion of a finger into the well and grip the gripping shape. According to some embodiments, the well may be between around ¼ inch and ¾ inch deep.

According to some embodiments, an air valve adapter may comprise an inserting end, a hollow end, a gripping section between the inserting end and the hollow end, and an aperture in the gripping section, wherein air may be supplied in the inserting end to travel to the hollow end.

According to some embodiments, an air valve adapter may comprise an inserting end, a hollow end, a gripping section between the inserting end and the hollow end, an aperture in the gripping section, wherein air may be supplied in the inserting end to travel to the hollow end and vice versa. In some embodiments, the inserting end may be pointed. In some embodiments, the inserting end may comprise a surface to mate against an air valve. In some embodiments, the inserting end may be sloped. In some embodiments, the gripping section may comprise a smaller outer diameter than an outer diameter of the hollow end. In some embodiments, the inserting end may comprise a hook. In some embodiments, the inserting end may comprise two generally parallel surfaces and a hole intersecting the generally parallel surfaces. In some embodiments, the hook may extend generally perpendicularly from the parallel surfaces of the inserting end. In some embodiments, the hook may comprise a spring that holds the hook in a closed position towards the inserting end. In some embodiments, the hook may comprise a slope from the inserting end towards the hollow end. In some embodiments, the slope may end at a ledge. In some embodiments, the ledge may be configured to brace against an inside surface of an air valve to hold open a flap of the air valve. In some embodiments, the ledge may be perpendicular to two flats of the hook. In some embodiments, the inserting end may comprise a first ledge. In some embodiments, the first ledge may have a surface generally perpendicular to an axis of the hollow end. In some embodiments, the inserting end may comprise a first ledge and a second ledge. In some embodiments, the first ledge may be generally parallel to the second ledge. In some embodiments, the inserting end may be between around ¼ inch and around 1 inch.

According to some embodiments, a method of inflating an inflatable may comprise inserting an inserting end of the air valve adapter into an air valve, twisting the air valve adapter so that one or more hooks of the air valve holds open a flap of the air valve, holding open the flap of the air valve by bracing the one or more hooks against a surface of the air valve and the flap, and blowing air through a hollow section of the air valve adapter and through an aperture of the inserting end and into the inflatable chamber.

According to some embodiments, a method of deflating an inflatable comprising inserting an inserting end of the air valve adapter into an air valve, twisting the air valve adapter so that one or more hooks of the air valve holds open a flap of the air valve, holding open the flap of the air valve by bracing the one or more hooks against a surface of the air valve and the flap, and allowing air to pass through a hollow section of the air valve adapter and through an aperture of the inserting end and out of the inflatable chamber.

The foregoing summarizes only a few aspects of the presently disclosed subject matter and is not intended to reflect the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

It is to be understood that both the foregoing general description and the following detailed description are exemplary and explanatory only and are not restrictive of the scope of the invention.

DETAILED DESCRIPTION

Reference will now be made in detail to exemplary embodiments, some examples of which are shown in the accompanying drawings.

To facilitate an understanding of the principles and features of the invention, various illustrative embodiments are explained below. In particular, the presently disclosed subject matter is described in the context of systems and methods for air valves and air valve adapters.

Exemplary disclosed embodiments include apparatuses, systems, and methods for air valves and air valve adapters. Air valves can be used as a part of an inflatable apparatus to supply air to inflate the inflatable apparatus. Applications of inflatable apparatus may include air mattresses, pool flotation devices, toys, hot tubs, or a number of similar devices. Inflatable devices may be inflated so as to stay afloat on a body of water, to provide cushion, or to contain or provide a barrier to water. Air valve adapters can be used supply air to and/or through the air valve, for example, into one or more air chambers within an inflatable apparatus.

Figure 1A:
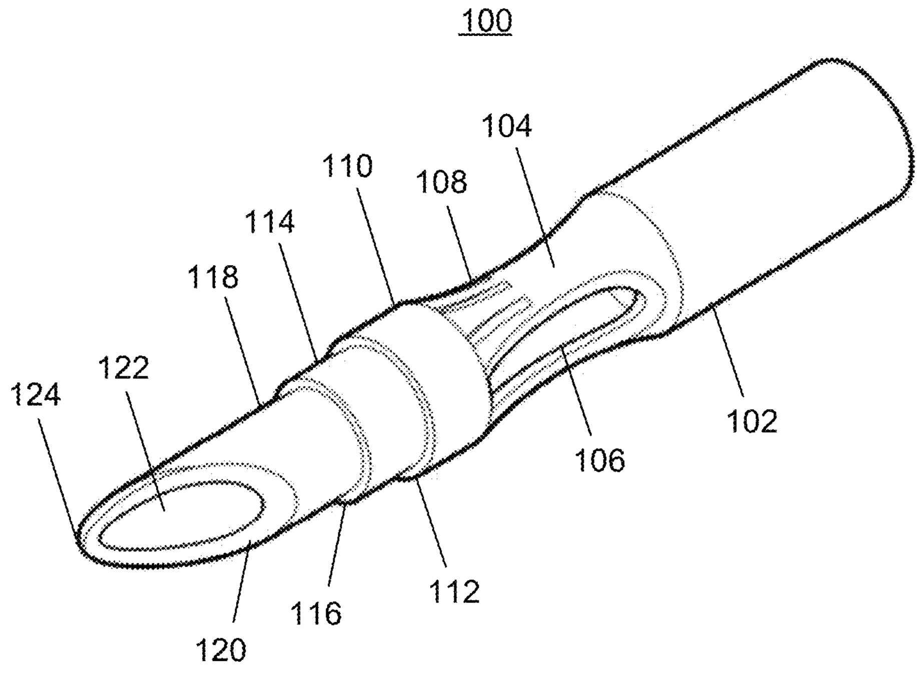
FIGS. 1A-1B illustrate an exemplary embodiment of an air valve adapter
Figure 1B:
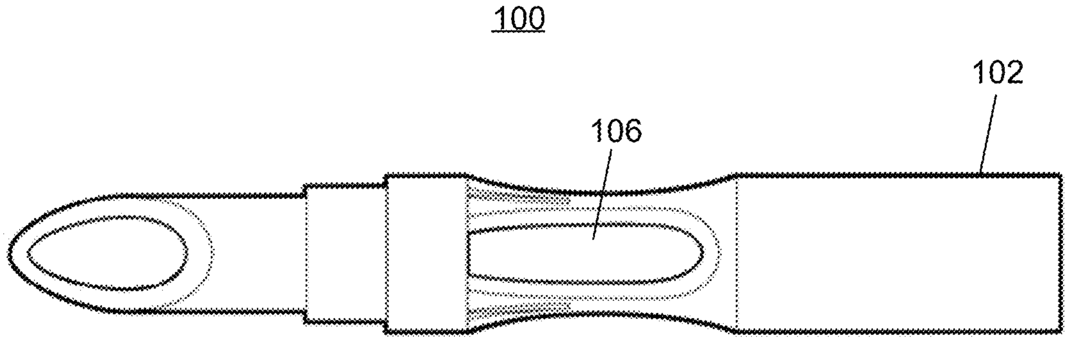

Referring now to the figures, wherein like reference numerals represent like parts throughout the views, air valves and air valve adapters will be described in detail. FIGS. 1A-1B illustrates an air valve according to some embodiments of the present disclosure.

As described herein, air may refer to a gas (e.g., Helium), or an ambient air.

Specifically, FIG. 1A illustrates air valve adapter 100. Air valve adapter may include hollow end 102 and inserted end 118. Hollow end 102 may allow air to pass to inserted end 118. Hollow end 102 may be supplied air from a user such as by blowing, from an air compressor, or from an automatic or manual air pump. Inserted end 118 may be placed inside of an inflatable apparatus. Hollow end 102 may be smooth so that someone can blow on its end (e.g., to inflate an inflatable). Current air valve adapters may not allow a user to easily hold the air valve adapter. Proposed embodiments may include where a distance between a first end of hollow end 102 and a second end of inserted end 118 may be sufficient to allow a user to hold the air valve adapter with a hand. For example, the distance may be between around two inches to eight inches. In some embodiments, the proposed air valve adapter may be of a sufficient length to be held by a user.

Air valve adapter 100 may include grip section 104. Grip section 104 may include an outer diameter less than an outer diameter of hollow end 102. Grip section 104 may slope from an outer diameter of hollow end 102 to a smaller diameter. Grip section 104 may be configured to allow for a user to grip air valve adapter 100. Grip section 104 can be hollow to allow air to pass from hollow end 102 to inserted end 118.

Grip section 104 may comprise aperture 106. Aperture 106 may be a single opening in grip section 104 or more than one opening in grip section 104. In some embodiments, aperture 106 may be configured to be covered by a user's fingers when air is passing from hollow end 102 to inserted end 118. In some embodiments, aperture 106 may be used for deflation to allow for air to exit an inflatable chamber. In some embodiments, aperture 106 may be configured to be sealed with a flexible seal that may be put in place to allow air to move from hollow end 102 to inserted end 118.

Grip section 104 may include an indention 108. Indention 108 may be configured to allow a user to grip air valve adapter 100.

Air valve adapter 100 may include center section 110. Center section 110 may include an outer diameter that is greater than an insert diameter of an air valve. Air valve adapter 100 may include plug section 114, first ridge 116, and/or second ridge 112. Plug section 114 may be configured to be inserted into an air valve so that air only passes within air valve 100. Plug section 114 may include a slope so that it may be mated to a number of air valves. First ridge 116 may include a surface configured to mate against an interior surface of an air valve. Second ridge 112 may include a surface configured to mate against an exterior surface of an air valve.

Inserted end 118 may include cut 120, opening 122, and/or edge 124. Cut 120 may include an angle configured to allow inserted end 118 to pass through an air valve. In some embodiments, cut 120 may be configured to pierce a seal within an air valve. In some embodiments, edge 124 may be configured to pierce a seal within an air valve. In some embodiments, opening 122 may allow air to pass to and/or from hollow end 102 and an inflatable chamber within an inflatable apparatus.

In some embodiments, air valve adapter 100 may produce a whistling sound when used to inflate and/or deflate. The whistling sound may be for amusement and/or to let the user know that air is passing through air valve adapter 100. In some embodiments, air valve adapter 100 may include apertures such as holes or elongated openings that cause a whistling sound when air passes through air valve adapter 100 (e.g., from a hollow end to an inserting end). In some embodiments, air valve adapter 100 may generate a whistling sound while inflation is occurring and stop whistling when an air pressure inside an inflatable chamber of an inflatable apparatus reaches a certain or threshold air pressure.

FIG. 1B illustrates air valve adapter 100. As discussed above, air valve adapter 100 may include aperture 106. In some embodiments, aperture 106 may be disposed on only one side of air valve adapter 100. In some embodiments, aperture 106 may pass from one side of air valve adapter 100 to the other side of air valve adapter 100 (e.g., like a through-hole). In some embodiments, aperture 106 may include two or more openings.

In some embodiments, air valve adapter 100 may be mounted on an inflatable product for ease of use (e.g., next to an air valve). In some embodiments, air valve adapter 100 may be mounted using clips, a tether, a sheathe, or other receiving surface for holding air valve adapter 100 when the adapter is not in use.

FIGS. 2A-2B, 3A-3D, 4A-4C, 5A-5B, and 6A-6C illustrate exemplary embodiments of air valves. Certain features of the air valves illustrated in FIGS. 2A-2B, 3A-3D, 4A-4C, 5A-5B, and 6A-6C are not shown or discussed in these examples where such features may be similar to those discussed for other embodiments.

For example, some embodiments may include hooks (e.g., hooks 208) but no aperture (e.g., aperture 106) or an aperture of a different shape (e.g., aperture 360).

Figure 2A:
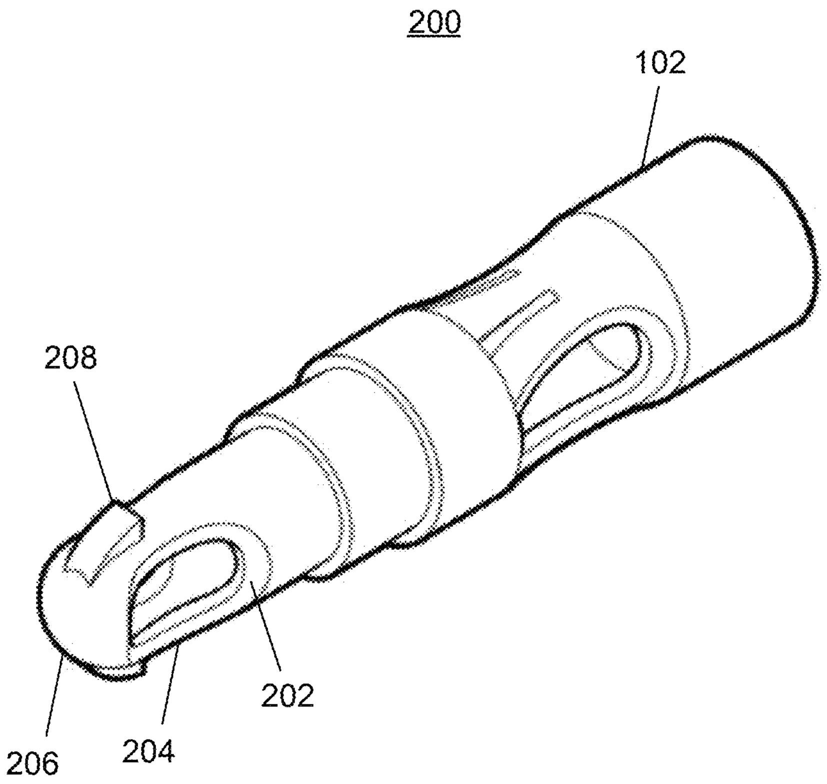
FIGS. 2A-2B illustrate an exemplary embodiment of an air valve adapter
Figure 2B:
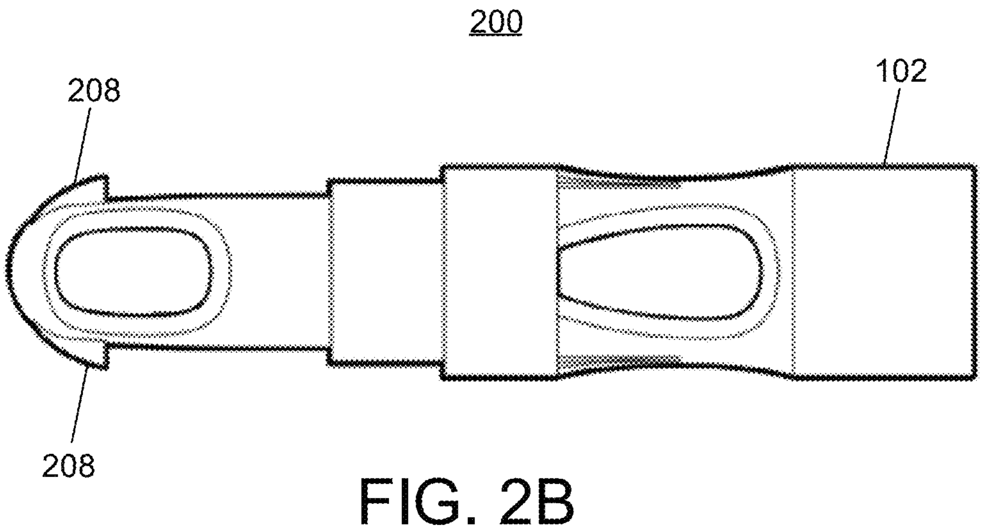

FIGS. 2A-2B illustrate air valve adapter 200. Air valve adapter 200 may include inserting end 202. Inserting end 202 may include aperture 204, end 206, and/or hook 208. Aperture 204 may allow air to pass to/from a hollow end (e.g., hollow end 102) of air valve adapter 200 to an inflatable chamber of an inflatable apparatus. Aperture 204 may include a single opening or more than one opening. Aperture 204 may be shaped like an eyelet. A length of the eyelet may be perpendicular to one or more hooks (e.g., hooks 208). An axis of a rounded portion of the eyelet may be perpendicular to one or more hooks (e.g., hooks 208).

End 206 may include a rounded surface. Hook 208 may include one or more hooks. Hook 208 may be configured to attach to an air valve. In some embodiments, hook 208 may attach air valve adapter 200 to an air valve in one position and be configured to release from the air valve in another position. FIG. 2B illustrates air valve adapter 200 with hooks 208 disposed on each side of inserting end 202. Hooks 208 may be disposed perpendicular to an aperture 204 of the inserting end. Hooks 208 may be used to hold open a flap of an air valve (e.g., a flap 910 of FIG. 9). Hooks 208 may be configured to brace against a bottom surface of an air valve to hold open the flap. In some embodiments, inserting end 202 may be twisted after penetrating the air valve flap to hold open the air valve.

Figure 9:
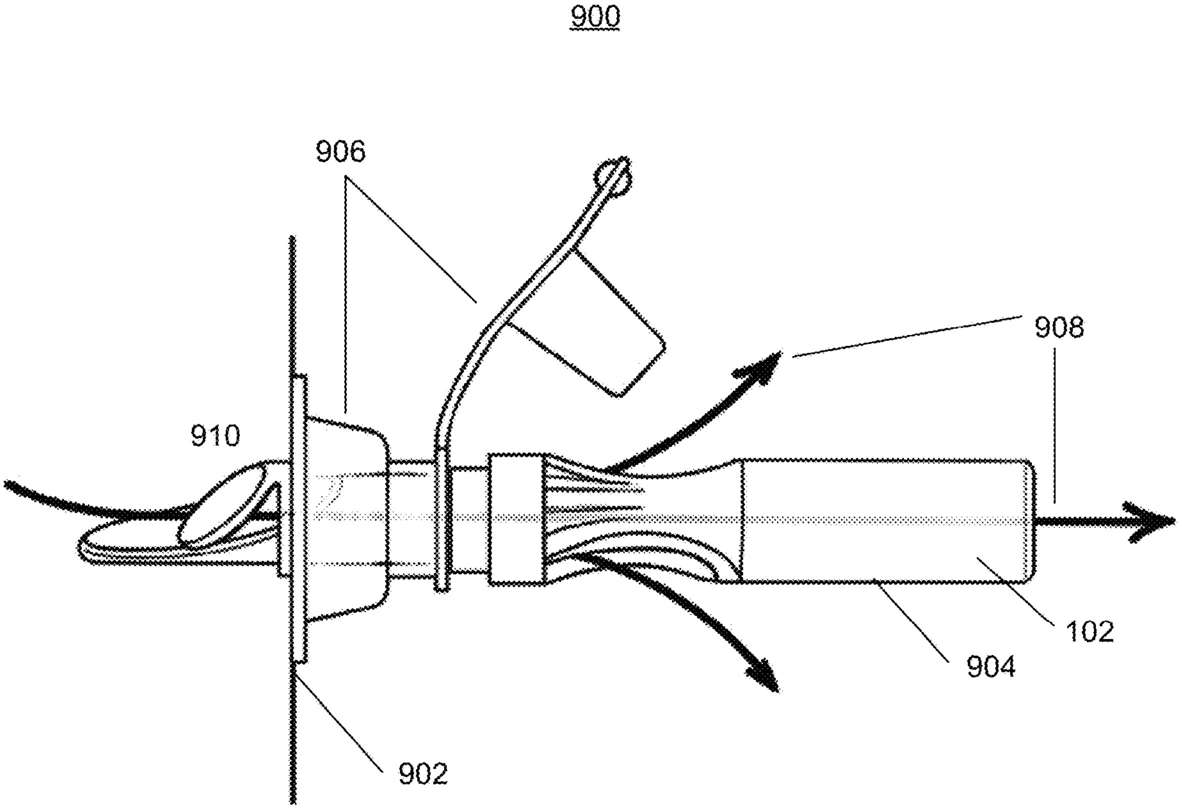
FIG. 9 illustrates an exemplary operating mode of an air valve and air valve adapter.

Hooks 208 may be configured to brace against a surface of an air valve while an end (e.g., end 206) holds open the flap (e.g., flap 910 of FIG. 9). The tension between end 206 and hooks 208 may hold open the flap when hooks 208 are engaged even when a user is not holding a hollow end. In this way, the air valve adapter may be used to inflate, for example, with an air blowing machine attached to a hollow end of the air valve adapter or used to deflate, for example, if nothing is attached to a hollow end of the air valve adapter.

In some embodiments, air valve adapter 200 may be of a length so that a user can blow through one side of air valve adapter 200 and so that air inserts through inserting end into an inflatable (e.g., to cause inflation) or out through the inserting end out of an inflatable (e.g., to cause deflation).

In some embodiments, hooks 208 may extend to a width of between around 0.3 inches and around 0.4 inches, for example from an outside of one hook to the outside of another hook. A surface such as 206 or a plug section (e.g., plug section 114) or a step (e.g., first and second ridges 112, 116) may seal against a mouth or throat of a valve to keep air within an inflatable chamber (e.g., inflatable chamber 902). Each of these surfaces may be provided in an air valve adapter to adapt to different diameter valve mouths or throats.

Figure 3A:
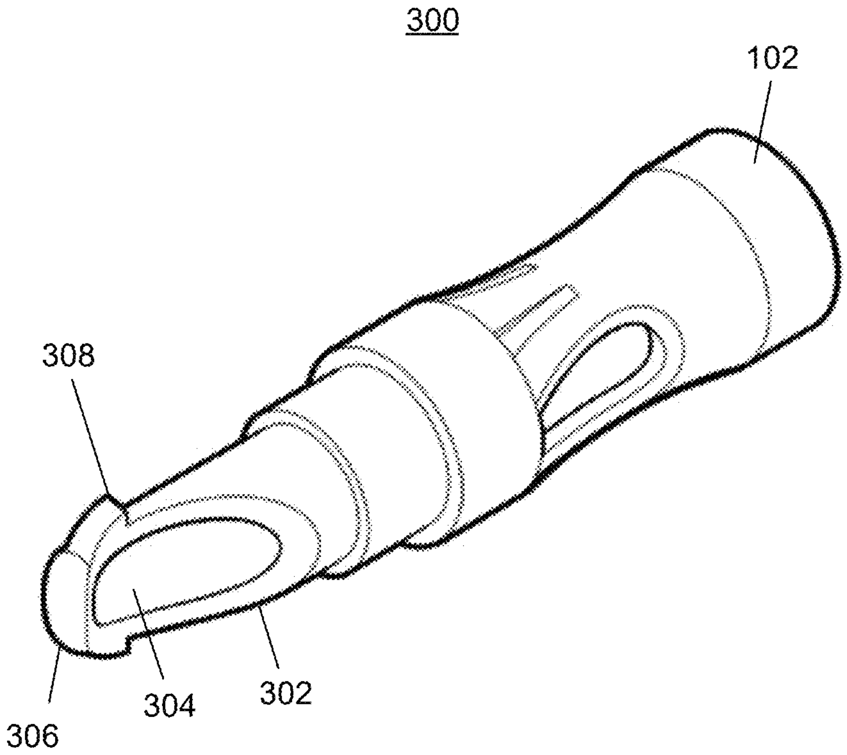
FIGS. 3A-3B illustrate an exemplary embodiment of an air valve adapter
Figure 3B:
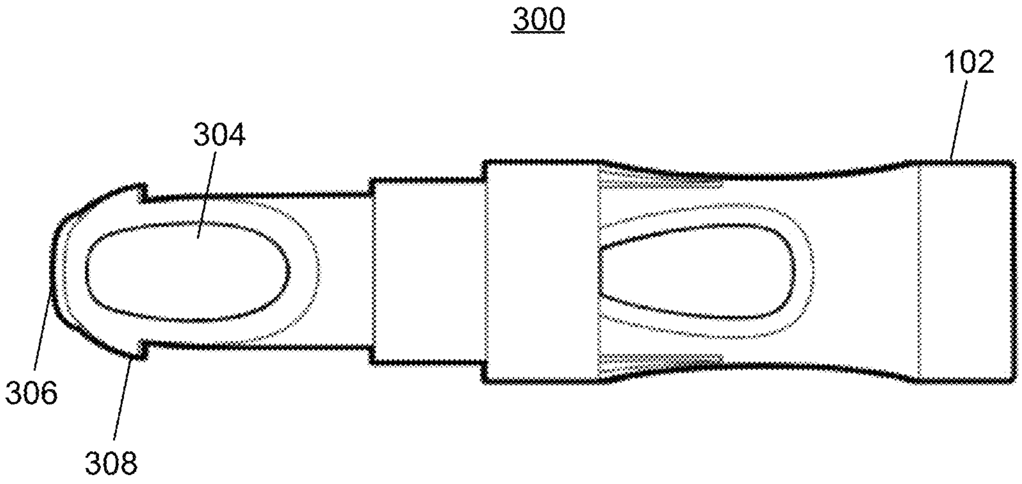

FIGS. 3A-3B illustrate air valve adapter 300. Air valve adapter 300 may include inserting end 302. Inserting end 302 may include aperture 304, end 306, and/or hook 308. Aperture 304 may have an opening at a cut (e.g., 120).

Figure 3C:
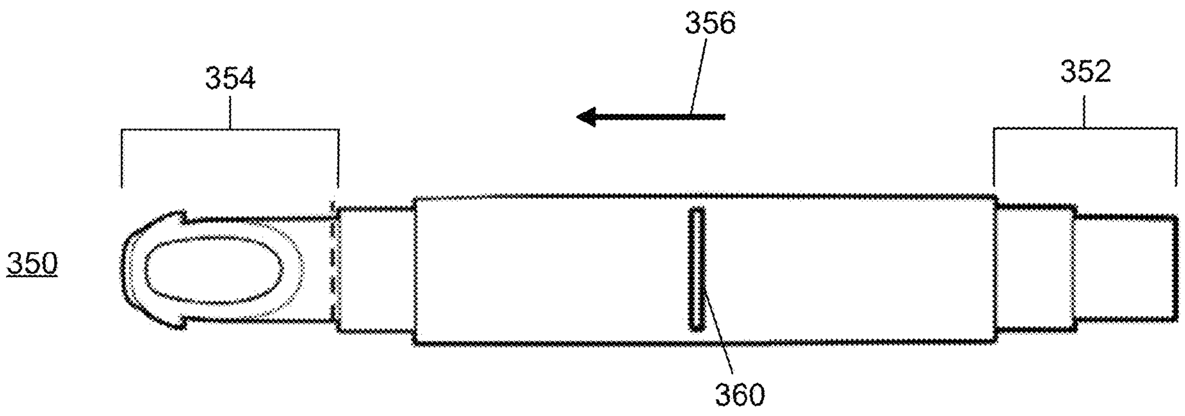
FIGS. 3C-3D illustrate an exemplary embodiment of an air valve adapter
Figure 3D:
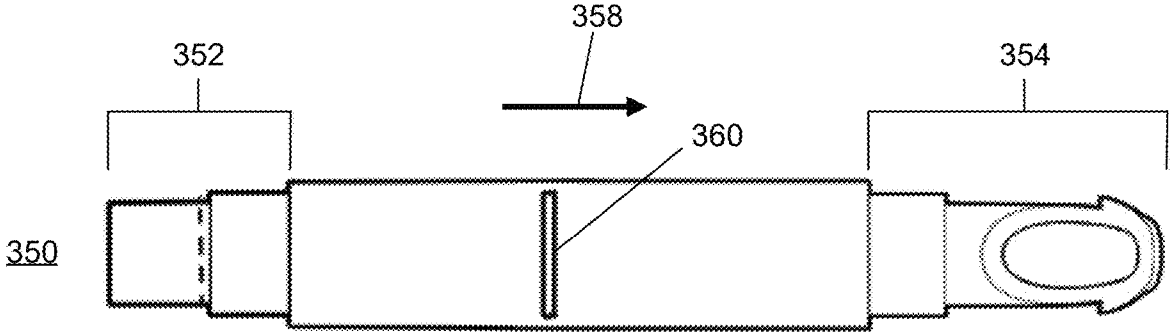

FIGS. 3C-3D illustrate air valve adapter 350. Air valve adapter 350 may include aperture 360. Aperture 360 may include a seal configured to allow air to pass in a direction when the air reaches a certain air pressure. Air valve adapter 350 may include inflation end 352 and deflation end 354. Inflation and deflation ends 352, 354 may be configured to be inserted within an air valve. Inflation and deflation ends 352, 354 may include features for mating against an air valve (e.g., first ridge 116, second ridge 112 of air valve adapter 100).

As shown in FIG. 3C, air may travel generally in direction of direction 356 to deflate an inflatable chamber of an inflatable apparatus. As shown in FIG. 3D, air may travel generally in direction of direction 358 to inflate an inflatable chamber of an inflatable apparatus.

Figure 4A:
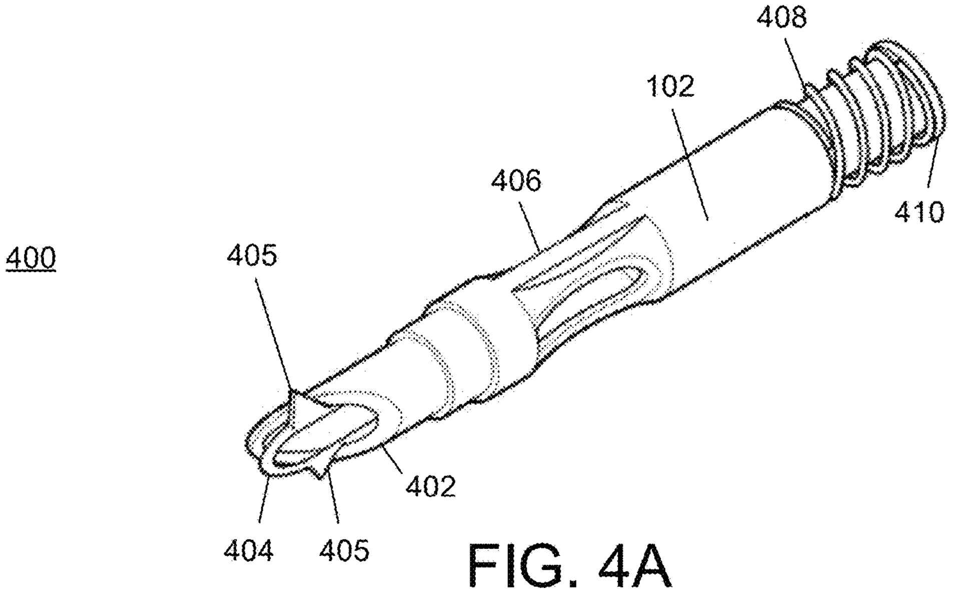
FIGS. 4A-4C illustrate an exemplary embodiment of an air valve adapter
Figure 4B:
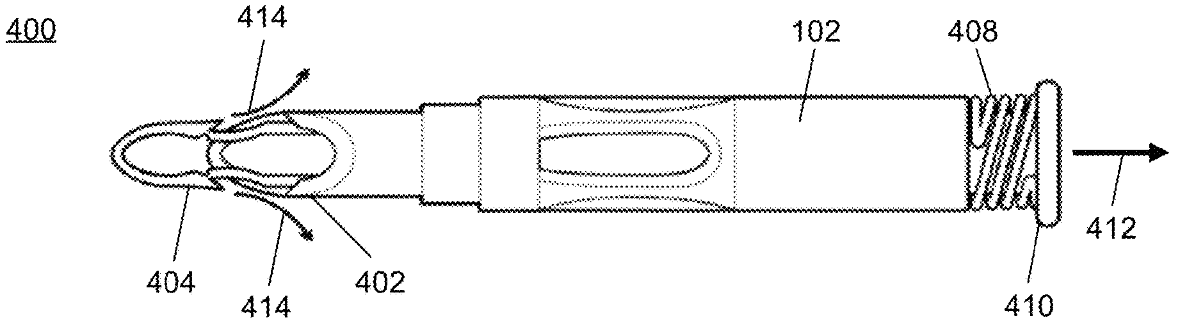
Figure 4C:
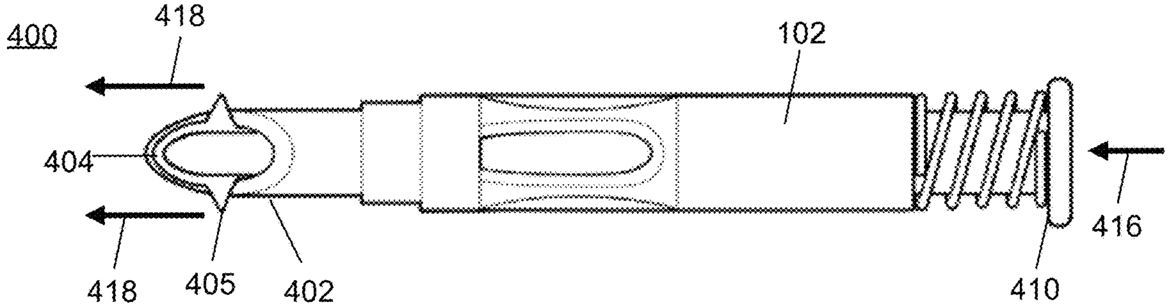

FIGS. 4A-4C illustrate air valve adapter 400. Air valve adapter 400 may include inserting end 402 and/or plunger section 404. Plunger section 404 may be configured to extend from the end of inserting end 402. Hollow end 102 may be configured to receive plunger 410. Plunger section 404 may be mechanically connected to plunger 410. Air valve adapter 400 may include spring 408. In some embodiments, spring 408 may supply a force to hold plunger 410 open (e.g., plunger section 404 is retracted towards inserting end 402 as shown in FIG. 4A). In some embodiments, spring 408 may be configured to supply a force to hold plunger 410 closed (e.g., plunger section 404 is extended from inserting end 402 as shown in FIG. 4B).

A user may provide a force against plunger 410 and/or spring 408 to move plunger section 404. Plunger section 404 may include hooks 405. In some embodiments, air valve adapter 400 may include rib 406. Rib 406 may span a section with a smaller diameter (e.g., grip section 104 from FIG. 1). Rib 406 may provide a surface for gripping by a user.

FIG. 4B illustrates air valve adapter 400 in a configuration where plunger 410 is depressed. In some embodiments, in the shown configuration, spring 408 may be supplying a force generally in direction 412. Plunger section 404 may be extended when plunger 410 is depressed. Plunger section 404 can be more narrow when plunger section 404 is extended. In some embodiments, hook 405 may be retracted when plunger section 404 is extended. Hooks 405 may travel generally in direction 414 when plunger 410 moves in direction 412.

FIG. 4C illustrates air valve adapter 400 in a configuration where plunger 410 is not depressed. In some embodiments, hooks 405 may be extended when plunger 410 is not depressed. Hooks 405 may be engaged within an air valve to hold air valve adapter 400 against the air valve when they are engaged. Plunger section 404 may move generally in direction 418 when plunger 410 moves generally in direction 416 (e.g., when pressed by a user).

Figure 5A:
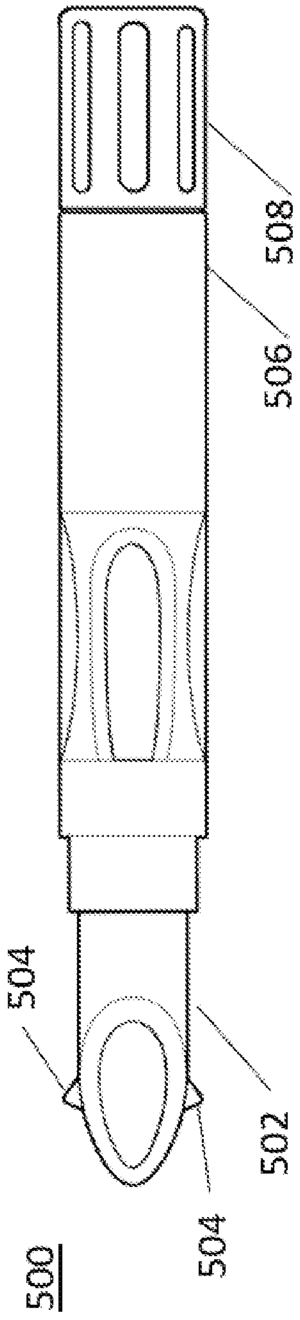
FIGS. 5A-5B illustrate an exemplary embodiment of an air valve adapter
Figure 5B:
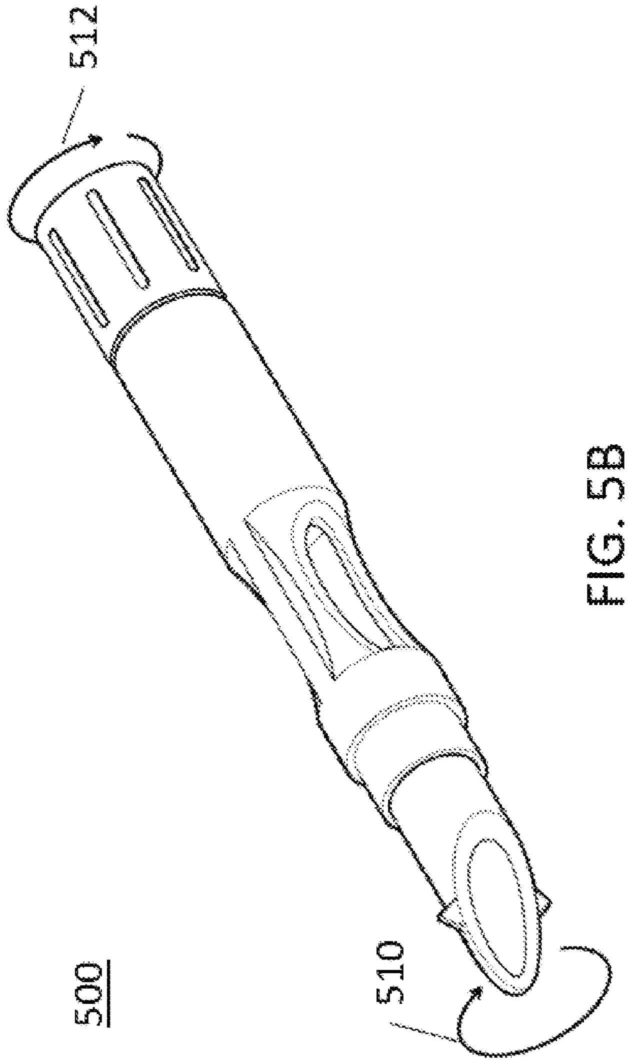

FIGS. 5A-5B illustrate air valve adapter 500. Air valve adapter 500 may include inserting end 502, hollow end 506, and/or rotating section 508. Inserting end 502 may include one or more hooks 504. Inserting end 502 may be mechanically connected to rotating section 508.

FIG. 5B illustrates air valve adapter 500. Inserting end 502 may move in direction 510 when rotating section 508 moves in direction 512 (e.g., by a user moving rotating section 508). For example, a user may rotate rotating section 508 to adjust the position of inserting end 502 and/or hooks 504.

Figure 6A:
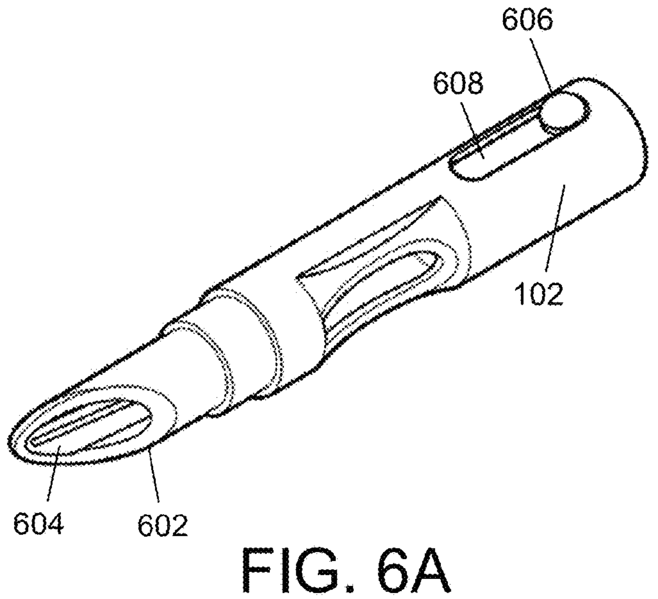
FIGS. 6A-6C illustrate an exemplary embodiment of an air valve adapter
Figure 6B:
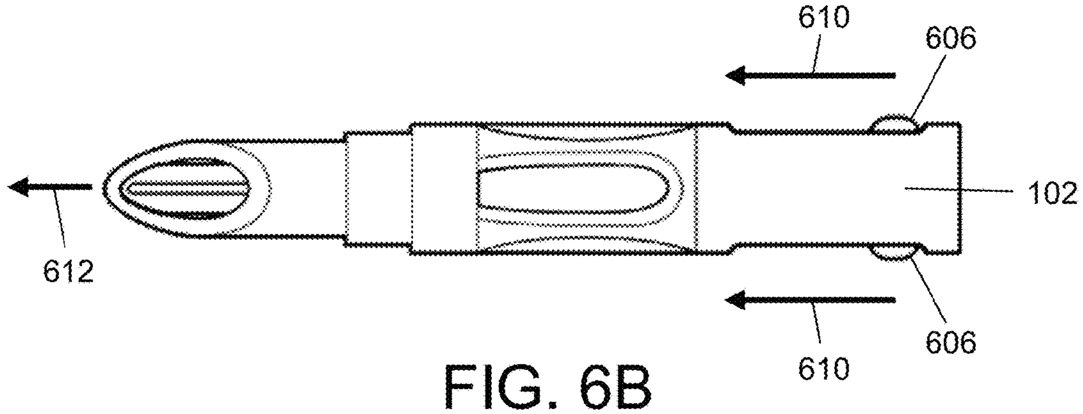
Figure 6C:
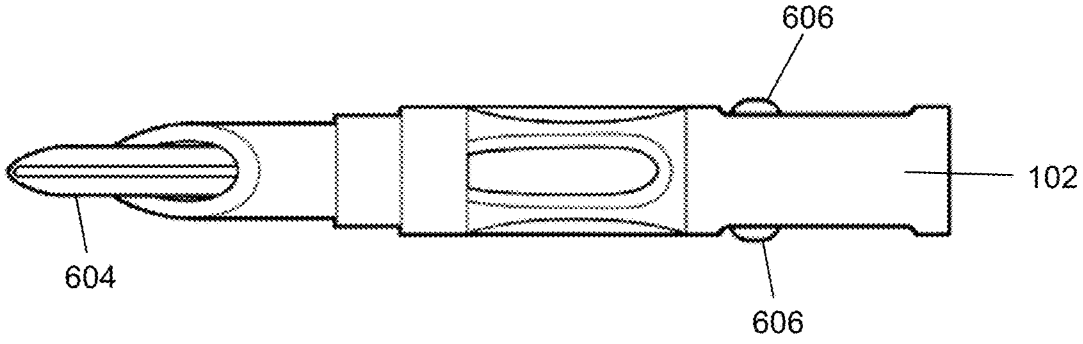

FIGS. 6A-6C illustrate air valve adapter 600. Air valve adapter 600 may include inserting end 602, plunger section 604, protrusion 606, and/or slot 608. Plunger section 604 may be configured to move from a retracted position to an extended position. As shown in FIG. 6B, plunger section 604 may be configured to move in direction 612 when protrusions 606 move in direction 610 (e.g., by operation of protrusions 606 by a user). As shown in FIG. 6C, plunger section 604 may be extended away from inserting end 602 when protrusion 606 is moved. In some embodiments, protrusion 606 may include one or more protrusions 606.

Figure 7A:
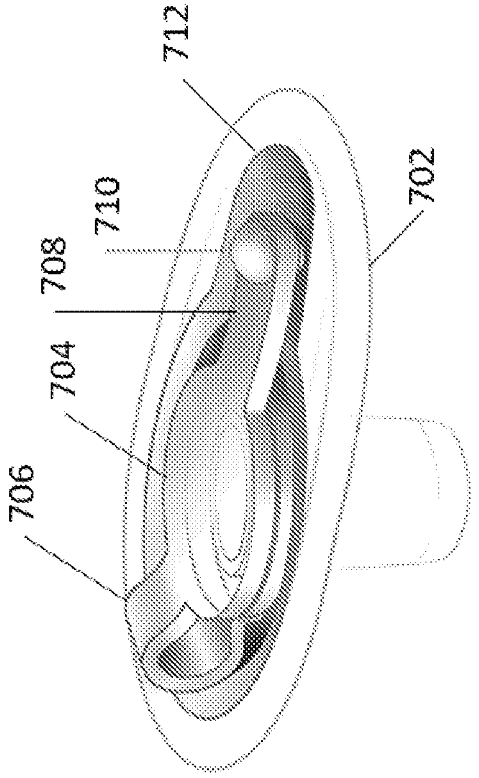
FIGS. 7A-7B illustrate an exemplary embodiment of an air valve
Figure 7B:
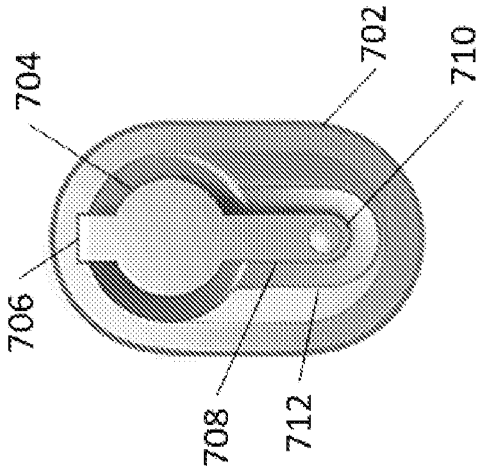

FIGS. 7A-7B illustrate air valve 700. Air valve 700 may include base 702. Base 702 may be attached to an inflatable, for example, by an adhesive and/or a weld. Air valve 700 may include top 704, hinge 706, tab 708, grip 710, and well 712. Tab 708 may be of sufficient length such that grip 710 may be gripped and pulled. Grip 710 may include a sphere or other shape that can be gripped and held by a user. Grip 710 can rest in well 712. Well 712 may be of a width and length sufficient that a user may hold grip 710. For example, even if a user's fingers are large and/or wet, the user may reach into well 712 to hold grip 710.

According to some embodiments, the gripping shape may be spherical. According to some embodiments, the gripping shape may be one or more ridges. The ridges may be in a line perpendicular to the well to allow for better grip. The gripping shape may extend above the tab or below the tab. According to some embodiments, the well may be concave. According to some embodiments, the well may allow a user to extend a portion of a finger into the well and grip the gripping shape. According to some embodiments, the well may be between around ¼ inch and ¾ inch deep. Around in this context includes loose engineering tolerances. Around ¼ inch to around ¾ inch depth and/or a concave shape can be enough to allow a user to insert a portion of the user's finger into the well.

Figure 8C:
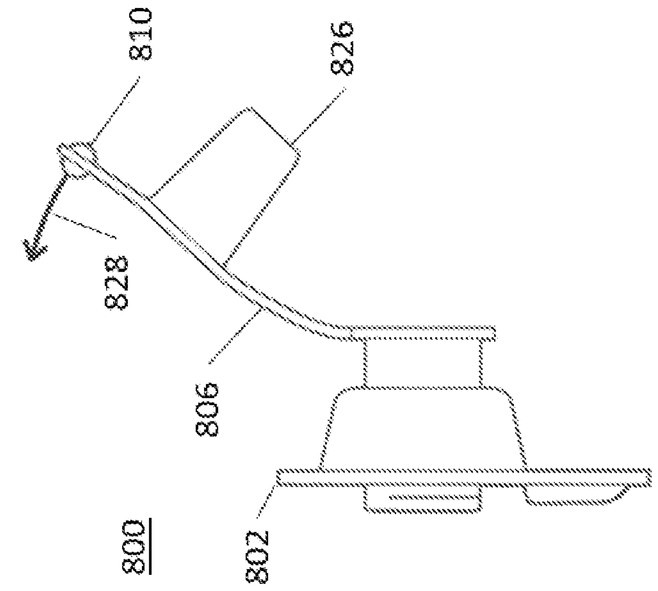
FIGS. 8A-8C illustrate an exemplary embodiment of an air valve
Figure 8B:
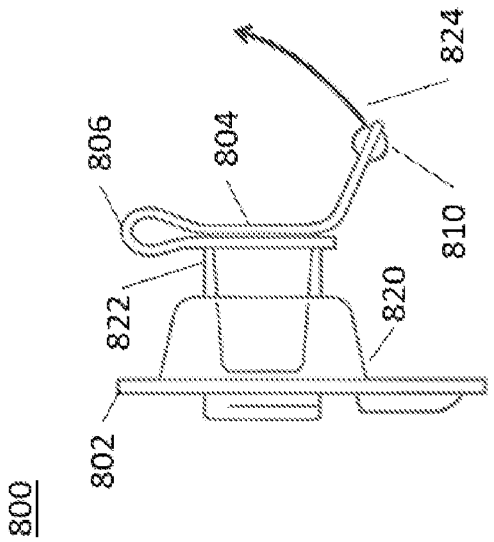
Figure 8A:
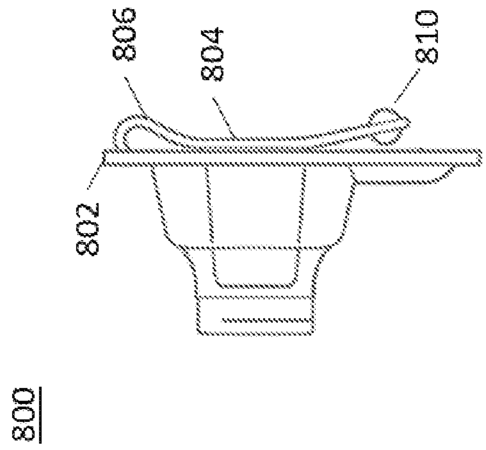

FIGS. 8A-8C illustrate air valve 800. Air valve 800 may include base 802. Base 802 may be attached to an inflatable, for example, by an adhesive and/or a weld. Air valve 800 may include top 804, hinge 806, and grip 810. In some embodiments, when grip 810 is pulled upwards generally in direction 824 as shown in FIG. 8B, extension sections 820 and 822 may be pulled away from base 802. Extension sections 820 and 822 may allow a user to access grip 810 and top 804 more easily. In some embodiments, when grip 810 is pulled generally in direction 828 that plug 826 is detached from extensions sections 820, 822 and/or base 802. For example, 810 may rotate as hinge 806 opens.

Features described in relation to FIGS. 8A-8C may be included as part of an air valve with two stages of plugs (e.g., plug 826 and a second plug).

It is also contemplated that air valves described herein may be configured to trap liquid within a container (e.g., a chamber that receives liquid). For example, the container may be a wall of a pool.

FIG. 9 illustrates an exemplary operating mode 900 of an air valve and air valve adapter. As shown in FIG. 9, air valve adapter 904 may be mated to air valve 906. In some embodiments, air valve adapter 904 may allow air to escape from inside an inflatable chamber of an inflatable apparatus generally in directions 908. In some embodiments, air may pass through air valve 900 to inflate an inflatable chamber of an inflatable chamber (e.g., inflatable chamber 902), where air is supplied from a user such as by blowing, from an air compressor, or from an automatic or manual air pump. Flap 910 may keep inflatable chamber 902 sealed or partially sealed when nothing is pressing against it or keeping it held open.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. In particular, aspects of the present disclosure have been described as relating to systems and methods for providing a pool hub. Additionally, other equivalent methods or composition to these described aspects are also contemplated by the teachings herein. Therefore, the present disclosure should not be limited to any single aspect, but rather construed in breadth and scope in accordance with the appended claims.

What is claimed is:

1. An air valve adapter comprising:
an inserting end,
a hollow end,
a gripping section between the inserting end and the hollow end,
an aperture in the gripping section,
a plug section located between the gripping section and the inserting end, wherein the plug section comprises at least one ridge that is flanged in a radial direction of the air valve adapter with respect to the inserting end;
wherein the inserting end is cut along a cutting plane producing a cross-section of the inserting end;
wherein the cutting plane is sloped obliquely with respect to a longitudinal axis of the air valve adapter and intersects the longitudinal axis; and
wherein the cross-section comprises an annular surface.

2. The air valve adapter of claim 1, wherein the inserting end is pointed.

3. The air valve adapter of claim 1, wherein the inserting end comprises a surface to mate against an air valve.

4. The air valve adapter of claim 1, wherein the gripping section is hollow.

5. The air valve adapter of claim 4, wherein the gripping section comprises a smaller outer diameter than an outer diameter of the hollow end.

6. The air valve adapter of claim 1, wherein the inserting end comprises at least one hook.

7. The air valve adapter of claim 6, wherein the inserting end comprises an opening extending at least partially through the inserting end in a radial direction of the air valve adapter, wherein the opening is oval-shaped.

8. The air valve adapter of claim 7, wherein the at least one hook extends perpendicular to a length of the oval-shaped opening.

9. The air valve adapter of claim 1, wherein the hollow end is configured to receive a plunger, wherein a spring is configured to supply a force to hold the plunger in an open position, wherein a plunger section is sheathed within the inserting end in the open position and the plunger section comprises at least one hook.

10. The air valve adapter of claim 6, wherein each hook of the at least one hook comprises a slope extending from the inserting end towards the hollow end.

11. The air valve adapter of claim 10, wherein the slope contacts a ledge of the at least one hook at an edge of the hook.

12. The air valve adapter of claim 11, wherein the hook is configured to brace against an inside surface of an air valve to hold open a flap of the air valve.

13. The air valve adapter of claim 6, further comprising a rotating section, wherein the rotating section is located on a side of the hollow end opposite the gripping section; and wherein a rotation of the rotating section results in a rotation of the inserting end.

14. The air valve adapter of claim 1, wherein the at least one ridge comprises a first ridge and a second ridge, wherein the first ridge is flanged in the radial direction with respect to the second ridge and the ridge is flanged in the radial direction with respect to the inserting end.

15. The air valve adapter of claim 1, wherein the hollow end is configured to receive a plunger, wherein a spring is configured to supply a force to hold the plunger in a closed position, wherein a plunger section extends from the inserting end in the closed position.

16. The air valve adapter of claim 15, wherein the gripping section further comprises a rib spanning at least partially across a length of the gripping section and the rib extends in the radial direction to a point located further from a longitudinal axis of the air valve adapter in the radial direction than a position of the aperture of the gripping section.

17. The air valve adapter of claim 1, wherein the inserting end is between ¼ inch and 1 inch.

18. A method of inflating an inflatable comprising:
- inserting an inserting end of an air valve adapter into an air valve,
- twisting the air valve adapter so that one or more hooks of the air valve adapter holds open a flap of the air valve,
- holding open the flap of the air valve by bracing the one or more hooks against a surface of the air valve and the flap, and
- blowing air through a hollow section of the air valve adapter and through an opening of the inserting end and into an inflatable chamber;
- wherein the twisting of the air valve adapter comprises rotating a rotating section of the air valve adapter relative to the hollow section and the rotating section is located at an end of the hollow section opposite the inserting end.

19. A method of deflating an inflatable comprising:
- inserting an inserting end of an air valve adapter into an air valve,
- twisting the air valve adapter so that one or more hooks of the air valve adapter holds open a flap of the air valve,
- holding open the flap of the air valve by bracing the one or more hooks against a surface of the air valve and the flap, and
- allowing air to pass through a hollow section of the air valve adapter and through an opening of the inserting end and out of an inflatable chamber;
- wherein the twisting of the air valve adapter comprises rotating a rotating section of the air valve adapter relative to the hollow section and the rotating section is located at an end of the hollow section opposite the inserting end.

20. An air valve adapter comprising:
- an inserting end,
- a hollow end configured to receive a plunger,
- a gripping section between the inserting end and the hollow end,
- an aperture in the gripping section,
- wherein the inserting end is cut along a cutting plane producing a cross-section of the inserting end;
- wherein the cutting plane is sloped obliquely with respect to a longitudinal axis of the air valve adapter and intersects the longitudinal axis;
- wherein the cross-section comprises an annular surface; and
- wherein a spring is configured to supply a force to hold the plunger in an open position, wherein a plunger section is sheathed within the inserting end in the open position and the plunger section comprises at least one hook.

21. An air valve adapter comprising:
- an inserting end,
- a hollow end configured to receive a plunger,
- a gripping section between the inserting end and the hollow end,
- an aperture in the gripping section,
- wherein the inserting end is cut along a cutting plane producing a cross-section of the inserting end;
- wherein the cutting plane is sloped obliquely with respect to a longitudinal axis of the air valve adapter and intersects the longitudinal axis;
- wherein the cross-section comprises an annular surface; and
- wherein a spring is configured to supply a force to hold the plunger in a closed position, wherein a plunger section extends from the inserting end in the closed position.

* * * * *